Oct. 19, 1926.
W. G. FISCHER
1,603,530
AUTOMATIC TRAIN CONTROL
Filed June 5, 1923
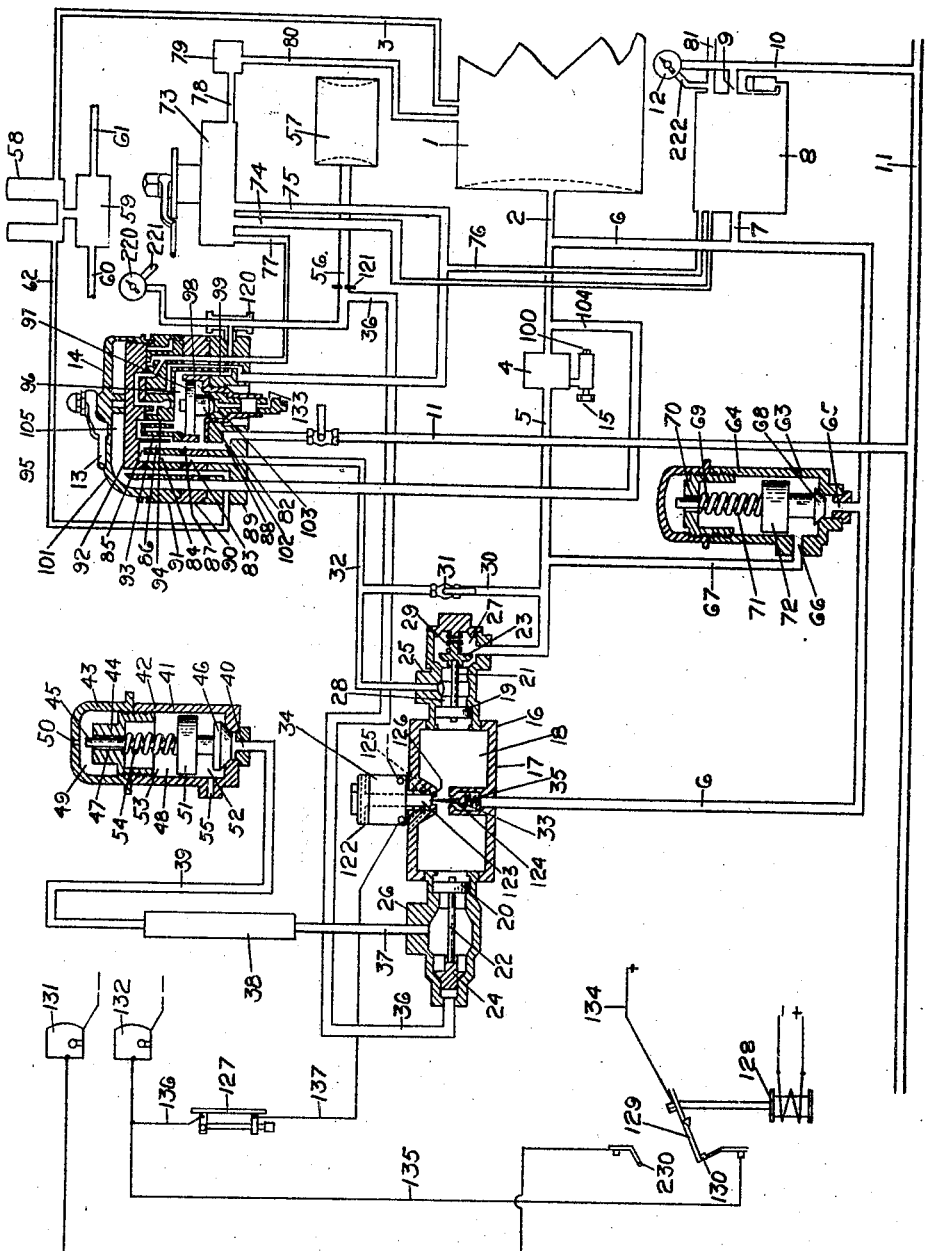
Inventor
WALTER GORDON FISCHER.
By Walter F. Murray
Attorney Patented Oct. 19, 1926.

1,603,530

UNITED STATES PATENT OFFICE.

WALTER GORDON FISCHER, OF INDIANAPOLIS, INDIANA.

AUTOMATIC TRAIN CONTROL.

Application filed June 5, 1923. Serial No. 643,491.

My invention relates to railroad control and is concerned with the method and means for actuating and controlling the air brake equipment. Structures embodying my invention may be employed with any of the block signals, air brake systems and means for effecting automatic co-operative action of such block signals and air brake systems. My invention is disclosed in conjunction with a brake system employing Westinghouse No. 6 E. T. brake equipment, shown and described in a publication by The Norman W. Henley Publishing Company of New York city, entitled "The Westinghouse No. 6 E. T. Air Brake Instruction Book," and in a publication by The Westinghouse Air Brake Company, Pittsburgh, Pa., entitled "No. 6 E. T. Locomotive Brake Equipment." The brake equipment under consideration is disclosed herein in conjunction with a Number 6 automatic, independent and distributing valve, whereby the railroad engineer may manually operate the brake system. In automatic block and brake actuating systems, this or other automatic valves may be employed.

In air brake systems, the sizes of the ports and pipes, and the lengths of the pipes and passages through which the compressed air must travel is of vital importance. The force with which the pressures in the system are modified are consequential in like manner. It is readily apparent that to effect an efficient and proper operation of a brake system extending throughout a train, especially a long heavy freight train a mile or more in length, an instantaneous application or release of the brakes throughout the entire system must be accomplished to avoid jamming and binding the opposite ends of the train of freight cars. An improper application of the brakes will generally do more damage than a head on collision.

An object of my invention is to provide novel means for effecting practically simultaneous and instantaneous operation of all the air brakes throughout a train.

Another object is to provide means for a sudden brake excitation throughout the train that will condition the system for a then gradual service brake application.

Another object is to provide means for the purpose stated that will function automatically, independent of the action of the engineman's or engineer's automatic brake valve.

Another object is to provide means for effecting a two phase service brake operation.

Another object of my invention is to provide means for so actuating the system that the brakes throughout a long train will be held in such equilibrium that no damage will result to the train from a release or further application of the brakes at any time after the first brake application.

Another object of my invention is to provide means whereby it will be possible to overcome the bringing of a long freight train to a standstill after a brake application, as has been the practice up to this time.

Another object of my invention is to eliminate the waste of time and energy resultant from bringing trains to a standstill after a brake application and before the train may again be moved.

These and other objects are attained by the means described herein and disclosed in the accompanying drawings, in which:

The figure is a diagrammatic view of an E. T. 6 system with which is incorporated devices for supplementing such system in accordance with my invention.

The main pressure reservoir 1 has extending from it pipes 2 and 3. The pipe 2 leads to the feed valve 4 that may be of standard equipment and which regulates the feed of fluid under pressure to the pipe 5. A pipe 6 leading from the pipe 2 is connected by means of a pipe 7 with the distributing valve 8 of standard equipment and of which no details are considered necessary. The distributing valve 8 is connected by means of pipes 9 and 10 with the brake pipe 11. The pipe 10 also communicates with a suitable gauge 12. The feed valve 4 regulates the pressure in the pipe 5 and in the brake pipe 11 when the handle 13 of the automatic brake valve 14 is in the running or holding position, these two pipes being connected in the automatic brake valve as is common in the art. The feed valve 4 is exemplified as a double pressure feed valve which has an operating handle 15 in order to regulate the pressure of the air which passes from the main reservoir 1 and the pipe 2 into the pipe 5 through the electropneumatic maintaining and cut out device 16. The insertion of the device 16 in the system constitutes one of the changes from the systems as they have been constructed up to this time. The device 16 comprises a suitable casing 17 having a central chamber 18 for the reception of air under pressure, which air may operate upon pistons 19 and 20 reciprocally carried by the casing 17 and upon the stems 21 and 22 respectively of which pistons are carried valves 23 and 24 respectively. The pistons 19 and 20 are contained in lateral extensions 25 and 26 formed on the casing 17. The extension 25 has formed in it a primary chamber 27 and a secondary chamber 28, communication between which chambers is controlled by the valve 23. A spring 29 operative upon the valve 23 yieldingly resists unseating of the valve 24. The pipe 5 communicates with the primary chamber 27. A by-pass 30 may establish communication through a valve 31 between the pipe 5 and the pipe 32 extending between the secondary chamber 28 and the automatic valve 14. In structures heretofore employed the by-pass 30 constituted the direct communication between the pipe 5 and the automatic valve 14. The pipe 6 may communicate with the central chamber 18, such communication being controlled by a valve 33. The valve 33 is operated from an electro-magnet 34, the function and operation of which will be explained hereafter. The spring 35 serves to yieldingly retain the valve upon its seat.

The extension 26 reciprocally contains the valve 24 for controlling communication between pipes 36 and 37. The valve 24 is actuated from the piston 20. The pipe 37 communicates with an enlarged chamber contained within the casing 38. The chamber within the casing 38 communicates by way of a pipe 39 with the inlet port 40 of the automatic gradual intermittent pop action graduated service brake valve 41. The device 41 comprises a casing 42 having a cap 43. Interiorly of the casing is mounted an adjusting nut 44 that serves the additional function of providing lateral support to the valve stem 45 carrying at its lower end the valve 46 for controlling communication through the inlet port 40. Such clearance is provided between the stem 45 and the walls of the bore 47 through which bore the stem 45 extends, so that air under pressure within the lower chamber 48 formed in the casing 42 may escape into the upper chamber 49 and from thence exhaust through the port 50 in the cap 43. The stem has mounted on it a disc-like throttle 51 that restricts communication between the lower portion 52 and the upper portion 53 of the chamber 48. A spring 54 abutting the throttle 51 and the adjustment nut 44 yieldingly resists unseating of the valve 46. The lower portion 52 of the chamber 48 exhausts through a port 55. The port 55 is larger than the port 50, the purpose of which will be explained hereafter. The pipe 36 leading from the lateral extension 26 of the casing 17 communicates with a pipe 56. The pipe 56 communicates with an equalizing reservoir 57, with the automatic brake valve 14, and the gauge 220. The gauge 220 is also connected with the main reservoir by a suitable pipe 221.

The pipe 3 leading from the main reservoir 1 communicates with a governor 58 controlling the valve 59, which valve 59 controls communication between the boiler by way of the pipe 60 with the compressor by way of the pipe 61. The structures are shown arbitrarily because they are standard equipment. A pipe 62 leading from the governor 58 communicates with the automatic brake valve 14. Communication between the pipe 6 and pipe 5 and pipe 11 may be established about the feed valve 3, by means of a kick-off device 63. The device 63 comprises a casing or a housing 64 having at its end an inlet port 65 in communication with the pipe 6 and having in its side a port 66 communicating with the pipe 67 for communication with the pipe 5. The housing 64 has contained within it a reciprocating valve 68 controlling communication between the ports 65 and 66. The valve stem 69 extends reciprocally through a spider 70 within the casing 64 and a spring 71 abutting the spider and the piston 72 mounted on the valve stem, yieldingly resists unseating of the valve 68. The piston 72, valve stem 69 and valve 68 are so related to the casing and spider elements that a relatively loose structure is attained whereby the piston may be actuated freely to permit a large flow of air under pressure from pipe 6 to pipe 5.

The independent brake valve 73, of standard equipment, is connected by means of pipe 74 with distributing valve 8. A pipe 75 leading from brake valve 73 communicates with the automatic brake valve 14 and has a pipe 76 communicating with the distributing valve 8. A pipe 77 connects the independent brake valve 73 with the automatic brake valve 14. A pipe 78 leading from the valve 73 communicates with the main reservoir by way of a reducing valve 79 and a suitable pipe 80. The distributing valve 8 communicates with the truck brake cylinders by way of a pipe 81. The pipe 81 is connected with gage 12 by a suitable pipe 222. The foregoing is all in accordance with the general practice and brake systems of this type.

The operation of my device is as follows:

The feed valve 4 regulates the pressure in the feed valve pipe 5 and in the brake pipe 11, when the handle 13 of the automatic brake valve 14 is in running or holding position. I have shown in the drawing the brake pipe as embracing an extension connecting the automatic brake valve 14 and that portion of the main brake pipe 11 disposed at the lower end of the figure. The extension is to be considered an integral part of the main brake pipe. The feed valve 4 is employed, by means of the operating handle 15, for regulating pressure of the air which passes from the main reservoir 1 and the pipe 2 into the pipe 11 by way of the electropneumatic maintaining and cut out device 16. In devices heretofore employed this control of the valve 4 functioned by way of the by-pass 30 disclosed herein. In the operation of devices embodying my invention, the valve 31 closes communication between pipes 5 and 32 by way of the by-pass 30. Air passes from pipe 32 through ducts 82, 83, 84, 85, 86, 87 and 88 in the valve elements 89, 90, 91 and 92 of the automatic brake valve 14 to reach the main brake pipe 11. Air from the duct 86 passes through ducts 93 and 94 in the element 91 and through duct 95 in the element 92, to the upper end of the chamber 96 formed in the automatic brake valve 14 and containing the equalizing piston 97. The upper end of the chamber 96 communicates, by way of a duct 98 in valve element 90 and duct 99 in valve element 89, with pipe 56 and equalizing reservoir 57.

When the handle 15 of the feed valve 4 is set in one position, the valve 4 is arranged to maintain a low pressure in the brake pipe and equalizing reservoir, for example say seventy pounds, and when set in another position it is arranged to maintain a high pressure, for example say ninety pounds, in the equalizing reservoir and main brake pipe. Feed valves such as 4 are provided with a suitable adjusting means such as the nut 100 for accurately maintaining a desired pressure.

The several elements referred to as valve elements 89, 90, 91, 92, and 101 co-operatingly constitute a number of different valves that may be moved in relation to one another for effecting various actions in the braking system. The valve element 92 is in what is termed a closed position when the automatic brake valve handle 13 is in the lap position for holding the brakes on the engine and train. By holding the brakes is meant permitting the brakes to operate upon the car wheels or in other words to assume an operative position. When the handle 13 is in the running position, the valve 101 opens the passage from the feed valve pipe 32 to main brake pipe 11 and equalizing reservoir 57 as previously explained. The feed valve 4 therefore maintains or builds up loss of pressure due to leakage or following an application of brakes. When the handle 13 is moved to the service position for making a service application of the brakes, the supply of air from the feed valve pipe 32 is blanked or shut off. At the same time a port is uncovered for allowing air from the equalizing reservoir 57 to exhaust to the atmosphere. This is common practice. The reduction of pressure in the upper portion of the chamber 96 containing the equalizing piston 97 causes the piston to rise under the influence of the greater pressure in the brake pipe 11, wherefore the valve 102 associated with the equalizing piston and controlling communication of the lower portion 103 of the chamber 96 and the atmosphere is opened and permits exhausting from the brake pipe 11 to the atmosphere. This exhaust will continue until the pressures on both sides of the equalizing piston are such that the valve 102 is closed. The reduction of pressure in the brake pipe causes an application of the brakes or movement of the brakes on the engine and train to an operative position. To hold the brakes applied following reduction of pressure in the brake pipe, the handle 13 is moved to lap position thereby interrupting the feed of air under pressure from the feed valve 4 to the brake pipe 11 and preventing building up of air pressure in the brake pipe which building up of pressure would automatically release the brake. The brakes may be released by moving the handle 13 to either the running or release position. If placed in the running position, the exhaust of air pressure from the equalizing reservoir will be stopped, thereby interrupting any further exhaust of air pressure from the brake pipe. The duct 85 in the face of the valve will permit air under pressure to flow from the feed valve pipe 32 to the brake pipe 11 and the equalizing reservoir, building up pressure on the train, and releasing the brakes on the engine and train and recharging the braking system. This recharge of the braking system, taking air from the main reservoir 1 through the feed valve 4, is necessarily slow, due to the restricted passage of the air through the feed valve 4. In the brake release of short trains this method of releasing through the feed valve is often employed, as it results in somewhat gradual release of the brakes. When used for releasing long trains, say fifty cars or more, the restricted opening in the feed valve 4 will not permit sufficient air to flow with sufficient rapidity to provide a practical release, due to the extreme length of brake pipe and the greater volume of air under pressure needed.

To overcome this the released position of the automatic brake valve handle 13 is provided for directly introducing air under pressure from the main reservoir 1 through pipes 2 and 104, to chamber 105 in the automatic brake valve 14. When the handle is in the released position the chamber 105 is placed in communication with the main brake pipe 11 through a suitable duct, not shown, in the valve element 92. This is common practice.

In the operation of devices as used up to this time, the operator places the handle 13 in the released position, until he judges, from the information on the air gauges before him, that the train brake system is recharged and that the brakes are released. He then places the handle in the running position. The operator often repeats this operation until complete release has taken place. Very rarely does the operator recharge his train brake pipe system to the exact pressure it is desired to carry, say 70 or 90 pounds, but he will charge to within about five pounds of the desired amount, say 65 or 85 pounds, and will then return the handle 13 of the automatic brake valve to the running position and permit the remainder of the desired pressure to be recharged through the feed valve 4 as previously described. In this way there is less danger of what is known as overcharging with the undesirable results thereby produced. Improper brake application may result in a number of damaging effects. It is impossible to overcome these damaging effects while employing the human element because no two men will apply brakes in the same way and besides no man will always apply the brakes in the same way or in the proper way. In fact it is rare when an operator does apply the brakes and release same properly. This is especially true in regard to long freight trains. For this reason crews of freight trains are under orders to bring their trains to a dead stop whenever the brakes have been applied and the speed of the train is not in excess of approximately eighteen miles per hour. If an insufficient quantity of air is exhausted from the main brake pipe, an improper application of the brakes of long freight trains, will result because of cars adjacent the engine have their brakes applied, while the cars remote from the engine, having no brake application, will jam into the cars adjacent the engine. Of course, if there is no distance limit within which the train is to be stopped, a gradual reduction of pressure in the brake pipe system will not have this effect, however, when it is desired to apply the brakes, it is generally necessary to stop the train or to slow the train within certain limits for certain reasons. After the brakes of the cars adjacent the engine have been actuated by the exhaust from the main brake pipe of the engine, the pressure at the remote end of the train is reduced by the movement of air under pressure toward the engine with the result that the brakes on the cars remote from the engine are then applied and the building up of pressure in the system adjacent the engine then serves to somewhat release the brakes of the cars adjacent the engine thereby serving to pull the train apart. In the same way after the brakes have been applied throughout a train, and the train has not come to a full stop, if it is desired to release the brakes, a small building up of pressure in the system adjacent the engine will serve to release the brakes adjacent the engine while the cars remote from the engine will still be responding to braking action, thereby pulling the front and rear of the train apart. It is for this reason that the order to stop freight trains after an application of the brakes, as previously explained, is rigidily enforced. The loss of time and energy incident to such practice reaches generally unappreciated proportions. Devices embodying my invention eliminate this waste.

In the operation of my device the automatically actuated valve 23 serves a function similiar to the duct 93 in the valve element 92, namely that of opening and closing the feed of air under pressure from the main reservoir 1 through the feed valve 4, through feed pipe 32 to main brake pipe 11. The valve 23 is electropneumatically operated, as will be described, and performs the same function automatically as regards the relationship between the feed pipe and the brake pipe as is performed by the movement of the handle 13 of the automatic brake valve 14, to the running or service or holding or lap position. The valve 23, therefore, automatically permits or prevents, the building up of pressure in the brake pipe or its connections which would affect the applying or releasing of the brakes, as well as affecting the applied or released condition of same. The valve 24, of the equalizing reservoir pressure release device developed in the lateral extension 26, controls communication between the equalizing reservoir 57 and the service brake valve 41. The normal piping of a locomotive equipped with #6 E. T. equipment is provided with a choke T 120. In my device the T 120 is drilled out to normal pipe size, and a choke 121 is provided in the pipe 56 in order to bear the proper relation to pipe 36, to the structure in the lateral extension 26, pipe 37 and the parts communicating therewith.

The valve 33, acts when its electric translating device, herein referred to as electromagnet 34, is energized to maintain compressed air inlet valve 33 open, and when the electromagnet is de-energized, the valve 33 closes because of the action of the spring 35 and the pressure from the pipe 6. An armature 122 associated with the electromagnet 34 is moved to its lowermost position when the magnet is energized. A stem 123 carried by the armature, extends beyond the bottom of the magnet and operates upon the stem 124 of the valve 33 for depressing the valve against the action of the spring 35. The lower end of the stem 123 on the armature also functions as a valve controlling communication between the central chamber 18 and the ducts 125 in the casing 17 above the valve seat 126. The stem 123 is capable of engagement with valve seat 126. From the foregoing it will be apparent that when the magnet is energized air under pressure may enter the chamber 18 and may operate the pistons 19 and 20 thereby opening the valve 23 and closing the valve 24, and that when the electromagnet is de-energized the sealing of the pipe 6 and the opening of the chamber 18 to the atmosphere permits the unseating of the valve 24 under the action of the air under pressure in the equalizing reservoir and in the pipe 36 while sealing communication between the pipe 5 and the feed pipe 32. As disclosed herein, de-energization of the magnet 34 results in a service brake application, while energization of the magnet results in a release of the brake with consequent recharging of the system. It is entirely within the scope of my invention to arrange my device so that the converse of this will be true so that de-energization will release and energization will apply the brakes. Any suitable means or system for controlling the electromagnet 34 may be employed. As shown herein the flow of electrical energy will be interrupted by opening switch 127 or by the de-energization of the electromagnet 128, or both with the opening of the circuits embracing controller 129 and contacts 130 and 230, as will sometimes be the case in automatic train stop or train control work, yellow light 131, generally designating caution or the like, green light 132, generally indicating clear block, will be extinguished and the magnet 34 will be de-energized. With de-energization of the electromagnet 34 the actions of the several elements will be as previously explained. Briefly, the means for maintaining the requisite pressure in the brake system has been cut off by the seating of the valve 23 in the cut-off device and maintaining means, thus one of the two elements for making a manual reduction of the brake pipe pressure has been accomplished automatically by the de-energization of the electromagnet 34. At the same moment that valve 23 is closed, the valve 24 is opened, allowing a sudden escape of pressure from the equalizing reservoir, such air under pressure exhausting as previously explained to and from the service brake valve 41. The enlarged chamber in the casing 38 permits a quick and voluminous escape of air under pressure from the equalizing reservoir, while the exhaust from such chamber to the atmosphere will be by way of an automatic gradual intermittent pop action on the part of the graduated service brake valve 41. The reduction of air pressure in the equalizing reservoir will accomplish a reduction of pressure in the air in the brake system as previously explained, thus, automatically accomplishing the second condition encountered in the manual reduction of the brake pipe pressure. After the equalizing valve 97 has been actuated, and has resumed its seat thereby closing off escape of air from the main brake system there is a lapse of several seconds wherein there is an adjustment between the pressures in the equalizing reservoir and the main brake system by way of an intermitting pop exhaust from the valve 41. The several seconds provides the next feature of my invention. From actual experience I have found that for a period of approximately from three to five seconds, or possibly more, the indicators of the equalizing reservoir pressure and brake pipe pressure gauges remains stationary showing that no actual reduction of pressure is taking place notwithstanding the fact that the air pressure is being exhausted through ports 50 and 55 of the pop valve 41. The action of the pop valve permits the equalization of pressures, the major portion of such equalization being accomplished by way of the action of the piston 97. After the piston 97 has seated, there is not complete equalization between the ends of the train because of the inherent physical difficulty of the venting of a brake pipe with a vent at one end of the pipe. It must be remembered that freight trains are commonly three quarters of a mile or more in length. After the valve 97 is actuated and there has been an exhaust at the front or engine end of the train, the pressure from the rear end, as it tends to arrive, at a final equalization with the pressure at the front end, is exhausted from the pop valve at as rapid a rate as it flows from the rear end of the train brake pipe. This takes a few seconds. In fact, no brake pipe pressure reduction is actually taking place. The pressure in the rear end of the brake pipe is merely equalizing to the point to which the pressure in the front end has been reduced. In other words there is no possibility of the pressure building up at the engine whereby to apply the brakes, but rather there is a building down of pressure at the rear of the train to correspond with the pressure at the front of the train. After this lapping, or pressure adjustment, the second phase of the brake application occurs. The second phase is accomplished by the adjustment of pressure between the air in the equalizing reservoir and the brake pipes. During this second phase, the valve 102 associated with the equalizing piston remains upon its seat and no further exhaust of air pressure is possible through the exhaust port 133 by way of which the lower portion of the chamber 96 exhausts. In this second phase, air under pressure from brake pipe 11 passes by way of ducts 93, 94, 95 and 98 to the pipe 56 and from thence into the pipe 36. Air under pressure from the equalizing reservoir 57 enters pipe 36, the choke 121 controlling the flow from the equalizing reservoir. The air under pressure in the pipe 36, which then moves to the pop valve 41, flows both from the main brake pipe and from the equalizing reservoir, such flows being continued until there is an equalization throughout the entire system. This adjustment corresponds to the slow repeated exhaust that an operator would effect by manual operation of the lever 13. The automatic adjustment accomplished by my device, amounts to a gradual graduated intermittent pop action reduction in the main brake pipe and equalizing reservoir.

As perviously noted the exhaust port 50 in the pop valve is smaller than the port 55. This structure is provided so that upon unseating of the valve 46 there will be a building up of pressure above the piston 51, which building up of pressure will serve to seat the valve until the pressure above the piston has been reduced to again permit unseating of the valve thereby effecting the described popping action. The adjustments of the various parts are self evident and any other suitable adjustment means may be employed. The adjustment of the several parts contemplates that the initial discharge of the first phase may be regulated, and that the discharge in the second phase shall also be regulated. For example if it is intended to effect a twenty pound reduction of pressure, the practical two phase application would be accomplished by first effecting a five to twelve pound reduction by way of the equalizing piston movement, and to then effect a second phase reduction by way of the pop valve 46 to bring the total reduction from five to twelve pounds to twenty pounds. This is merely by way of example, various conditions requiring various modifications of such phases. In the second phase of the application of my device, the pop action would continue until given pressure in the system is accomplished, although there may be an equalization between the pressure in the brake pipe and the equalizing reservoir. For recharging the system it must be remembered that the pressure in the main reservoir tank 1 is the highest carried, wherefore this pressure operating on the pistons 19 and 20 actuates the valves 23 and 24 and retains them in the positions shown in the figure. The opening of the valve 23 restores the normal flow of air pressure from the main reservoir 1 through the feed valve 4 to the brake pipe by way of the pipe 32, etc. Pressure is gradually built up in the brake pipe by means of the feed valve and the air pressure is maintained at the amount for which the feed valve is fed. This re-charging through the feed valve with its restricted port is practical with short trains and consequent brake pipes, however, on one hundred car trains, the re-charging of the brake system would be very difficult by way of the restricted supply furnished by the feed valve. After the previously described reduction has been made manually by oscillation of the handle 13 of the automatic brake valve, it is almost impossible to effect a slow smooth brake release with even as few as thirty cars. It is because of this condition that the standing order of the railroads require that the train make a dead stop after the application of the brakes provided the speed of the train has been reduced to eighteen or less miles per hour. In devices embodying my invention, the kick-off device 63 is utilized for effecting the releasing of the brakes. The function of the kick-off device is to directly introduce a large volume of high pressure main reservoir air into the brake pipe as rapidly as possible at first, in order to kick-off the brakes on long trains. When, therefore, the valve 23 unseats, the pressure within the pipes 5 and 67, together with the action of the spring 71 in the kick-off device are insufficient to retain the valve 68 upon its seat, whereupon the pressure within the high pressure main reservoir 1 unseats the valve 68 and permits a rapid direct flow to the braking system. This sudden burst or entrance of air into the system produces the kick-off effect so greatly desired in brake releasing. The valve 68 and its associated means are designed to introduce approximately fifteen pounds of pressure into the system whereafter the valve closes and remains closed. This rapidly introduced air pressure may be adjusted to meet varying conditions. In actual practice the valve 68 is operated several times, giving sudden hammer-like rushes of air against the triple pistons. After the valve 68 closes the remainder of the release and recharge is effected through the feed valve 4 as previously described. The action produced is a two phase graduated kick-off release with sudden hammer-like rushes of air against the triple pistons carried by the train cars, to start them toward released positions, and then the graduated final release effected by way of the feed valve 4 produces a gradual uniform release of the train and engine brakes as distinguished from the manual partial releases characteristic of brake releasing up to this time wherein a part of the train brakes release while the remainder continue to hold. From the foregoing it will be readily apparent that the phases may be increased to more than two if desired. It should be noted that the kick-off device is not a maintaining means as is the feed valve 4 but is a releasing and recharging means only and is not sensitive to delicate variations in pressure. The kick-off or blow effect incident to the functioning of the kick-off device prevents the uneven distribution of the recharging pressure as it builds up in the brake pipe and auxiliaries. The overcharging of the head end or front end of the train is thereby automatically avoided.

It is understood that an automatic train control or train stop device will only operate when the engineer or engine driver has failed. It is quite reasonable to assume therefore that an engine driver does not fail more than once a month at the most. The automatic train control or stop apparatus, therefore will function rarely but once a month. It is well recognized in the art of air brake operation that any air brake apparatus that functions very seldom will be inoperative when its operation is desired. To keep air brake equipment in good shape same should be operated frequently and freely. By providing means, for example the knife switch 127, whereby the operator may interrupt the flow of current to the electromagnet whereby to produce service brake or emergency reduction in brake pipe pressure, as the case may be, at the will of the operator, the apparatus may be employed repeatedly in the ordinary operation of the train, and the automatic control means thereby be kept in condition for emergency operation.

The opening of the knife switch 127 will break the circuit from the battery and embracing conductor 134, circuit conductor arm 129, and the contact 130, conductor 135, conductors 136 and 137, electromagnet 34 to the battery, and closing the switch will restore the circuit, re-energizing the magnet, and releasing the brakes. Any other suitable means for accomplishing this action may be employed.

When conditions are normal, the electromagnet is energized, wherefore the said pipe 5 is in communication with the said pipe 32 wherefore the operator may manually apply the automatic brake valve 14 and the independent brake valve 73 without in anywise affecting the automatic brake mechanism.

What I claim is:

In a pneumatic air brake system comprising a main pressure reservoir, a main brake pipe, means for controlling the admission of air to the main brake pipe, a feed valve for normally regulating the flow of air under pressure from the main pressure tank to the controlling means, a normally inoperative kick-off device for admitting air under pressure to the control means independent of the feed valve, means for exhausting the brake pipe, and a common means for controlling the brake pipe exhausting means, and the flow of fluid under pressure from the feed valve and the kick-off device to the first mentioned means for controlling the flow of air under pressure from the main pressure reservoir to the main brake pipe.

In testimony whereof, I have hereunto subscribed my name this 1st day of June, 1923.

WALTER GORDON FISCHER.